United States Patent [19]

DeGroot

[11] Patent Number: 4,566,255

[45] Date of Patent: Jan. 28, 1986

[54] TRAINING HALTER FOR CANINES

[76] Inventor: Alice A. DeGroot, 1768 Village Run North, Encinitas, Calif. 92024

[21] Appl. No.: 627,011

[22] Filed: Jul. 2, 1984

Related U.S. Application Data

[63] Continuation-in-part of Ser. No. 467,316, Feb. 17, 1983, Pat. No. 4,483,275.

[51] Int. Cl.⁴ .................. B68B 1/02; A01K 15/00
[52] U.S. Cl. ................................. 54/24; 119/130
[58] Field of Search ............ 54/24, 26, 85; 119/96, 119/129, 130

[56]  References Cited

U.S. PATENT DOCUMENTS

| 206,586 | 7/1878 | Leland | 54/24 |
| 422,626 | 3/1890 | Pruyne | 54/24 |
| 462,743 | 11/1891 | Sisson | 54/24 |
| 660,494 | 10/1900 | Evans | 54/24 |
| 2,932,930 | 4/1960 | Ray | 54/24 |

Primary Examiner—Robert P. Swiatek
Attorney, Agent, or Firm—Charmasson & Holz

[57]  ABSTRACT

A dog's training halter comprises a loop member for encircling the dog's muzzle, a collar member for encircling the dog's neck, and side members for connecting the loop member to the collar member on opposite sides of the dog's head. The loop member passes through a cinch ring for connection to a leash, and an upper connecting strap or rope connects upper portions of the muzzle loop and collar members together along the top of the dog's head.

6 Claims, 5 Drawing Figures

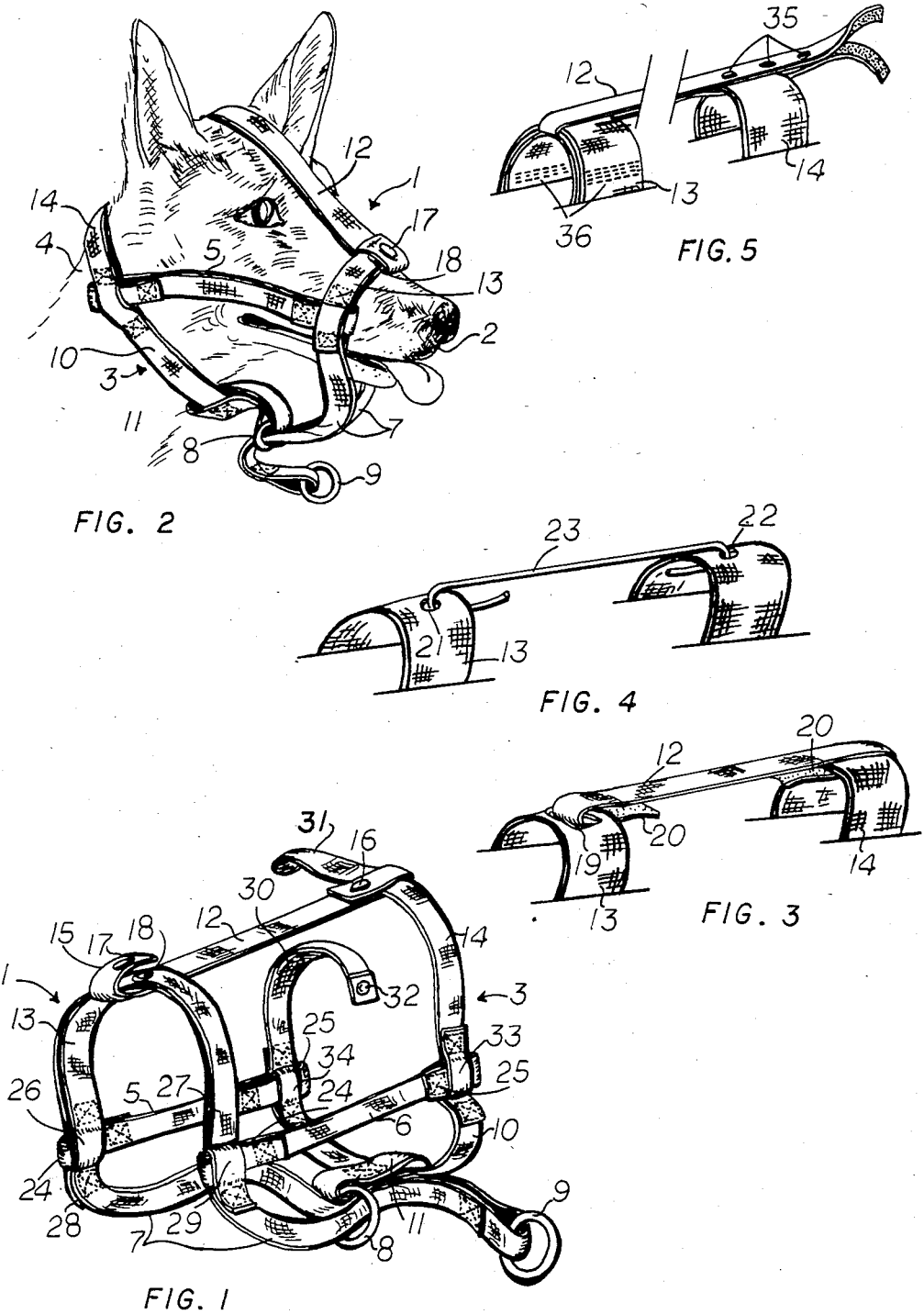

TRAINING HALTER FOR CANINES

This application is a continuation-in-part of Application Ser. No. 467,316 filed Feb. 17, 1983 and now U.S. Pat. No. 4,483,275.

BACKGROUND OF THE INVENTION

The invention relates to animal training and restraint devices such as halters, muzzles, and collars on leashes used in the training and control of canines.

These devices are used to bend a dog's actions to the master's will. The idea is to cause the dog to voluntarily comply, and avoid the physical tug-of-war that occurs when the dog wants to go a different direction than its master, or wants to move faster or slower than the master. Beyond the simple leash and collar, which engenders this type of contest, there are currently in use choking collars, which are simply a canine version of the hangman's noose, and inwardly spiked collars, which when tugged by the leash causes the dog to prefer to acquiesce to the master's wishes rather than suffer the pain of the spikes digging into its neck.

Both the choking collar and the spiked collar are based on the infliction of pain to restrain the dog, and are looked upon by some as being inhumane. In addition, they may not be very effective, first, because the directional guidance provided the dog is somewhat rough, and second, because the dog will respond in inverse proportion to the thickness of its pelt at the neck.

There is thus a need for a device which will more accurately direct the dog, and will do so without the infliction of pain on the animal.

SUMMARY OF THE INVENTION

The above-stated need is provided by the instant invention which directs the dog not by the infliction of pain to cause the dog to move in the right direction, but by means of a special halter which is constructed such that at least a substantial portion of the tension applied to the leash is directed to the dog's muzzle and not to its neck.

According to the present invention a training halter includes a loop member for encircling the dog's muzzle, a collar member for encircling the dog's neck, and side members on opposite sides of the dog's head for connecting the collar member to the loop member. The lower portion of the loop member passes through a ring cinch supported by the collar member and is connected to a leash. Thus tensioning the leash tightens the loop member around the muzzle of the dog.

A removable top member is provided for releasably attaching a top portion of the loop member to a top portion of the collar member. This prevents the loop member from slipping from side to side to a great extent and also prevents the loop member from slipping over the dog's nose.

In a preferred embodiment of the invention each side member is connected to at least one of the collar and loop members by a slip loop engaging that member in a slip-though fashion. This allows a certain degree of lateral and angular movement of the side members to allow the halter to adjust to the shape and movements of the dog's head.

Thus the halter of this invention allows the dog's handler to turn the animal's nose to point in the direction the animal should move without the application of unnecessary brute force and pain on the animal.

BRIEF DESCRIPTION OF THE DRAWINGS

FIG. 1 is a perspective view of a halter according to one embodiment of the invention;

FIG. 2 shows the halter of FIG. 1 in use on a canine; and

FIGS. 3, 4 and 5 illustrate alternate means for connecting the collar to the nose loop member.

DETAILED DESCRIPTION OF THE PREFERRED EMBODIMENTS

FIG. 1 shows a first embodiment of a dog's halter according to the invention. FIG. 2 shows the halter in use on a dog.

The halter shown in FIGS. 1 and 2 basically comprises a loop member 1 for encircling the dog's muzzle 2, a collar member 3 for releasably encircling the dog's neck 4, and side members 5, 6 for connecting the collar member 3 to the loop member 1 on opposite sides of the dog's head. Lower portions 7 of the loop member 1 pass through a cinch ring 8 and are connected together through a ring 9 by stitching as shown or by any suitable securing device such as overlapping portions of Velcro (Registered Trade Mark) material, snap fasteners, or similar means. A leash (not shown) is attached to the ring 9. Cinch ring 8 is secured to a lower portion 10 of the collar member 3 by means of a connecting strap 11.

A releasable top member or strap 12 is provided for connecting upper portions 13, 14 of the loop and collar members 1, 3 together along the top of the dog's head. This aids in maintaining the relative positioning of the loop and collar members, and preventing the loop member 1 from slipping over the dog's nose. As shown in FIG. 1, the member 12 comprises a strap connected at opposite ends to the loop and collar members by snap fasteners 15, 16. The snap parts 17, 18 of the fastener 15 are provided on the end of the member 12 and on the loop member 1, respectively. The snap parts of the other snap fastener 16 are provided on overlapping portions of the other end of the member 12, so that end bends back on itself to form a loop engaging over the collar member 3.

Some modified top members 12 are shown in FIGS. 3, 4 and 5. In FIG. 3 the upper portion 13 of the loop member 1 is provided with a slit 19. Opposite ends of the top member 12, which comprises a strap, are looped through the slit 19 and over the collar member 3, respectively. The ends and adjacent underlying portions of the member 12 are provided with some form of releasable fastener, such as overlapping portions 20 of Velcro (Registered Trade Mark) as shown, or snap fasteners or the like. The upper portion 14 of the collar member 3 may also be provided with a slit through which the looped end of the member 12 passes, for added restraint.

In FIG. 4 the upper portions 13, 14 of the loop and collar members are each provided with a hole or opening 21, 22 to which opposite ends of a rope, string, or cord 23 can be fastened as shown.

In FIG. 5, the top member 12 is doubled upon itself and captures the top layer of the upper portion 13 of the nose loop member as well as the collar member 14. Cooperating strips of releasable fasteners line the inner face of the top member 12 to provide a releasable adjustment of the spacing between the loop and collar members. Alternately or in addition to the fastener, snaps 35 may be used. The two layers of the loop member may be stitched on either side 36 to keep the top member from sliding toward one or the other side.

As shown in FIGS. 1 and 2, each side member 5, 6 has slip loops 24, 25 at opposite ends which engage the loop and collar members 1, 3 respectively. The loop member 1 is formed from separate upper and lower portions 13, 7. The upper portion is a double band formed by doubling a strap back over itself and stitching overlying portions of the strap together close to the opposite ends of the band to form loops 26, 27. The lower portion 7 extending through the cinch ring 8 terminates in two loops 28, 29 which together with the loops 26, 27 of the upper portion engage the forward slip loops 24 of the side members 5 and 6. The structure of the collar member 3 is similar, with the upper portion 14 comprising two releasable strap parts 30, 31 securable together by means of a buckle or other fastener 32 and having loops 33 at their free ends. The lower portion 10 is a strap with loops 34 at its free ends, which together with the loops 33 engage the rearward slip loops 25 of the side members 5 and 6.

This construction utilizing slip loop connections between the side, collar and loop members provides for some angular adjustment of the side members, depending on the length of the loop and collar member loops, and also allows a certain degree of relative translational movement, depending on the length of the slip loops 24, 25. This allows some flexibility and makes the halter self-adjusting to some extent. Thus the halter will conform substantially to the shape and movements of the dog's head. The length of the respective slip loops and connecting loops on the loop and collar members may be made adjustable by using releasable fasteners such as Velcro (Registered Trade Mark) or the like to form the loops instead of the stitching shown on the drawings. This provides even greater flexibility and allows the halter to be easily adjusted for different size dogs.

According to another modification the lower portion 40 7 of the loop member may comprise a bifurcated extension at the free end of a leash which passes through the cinch ring and has loops at its ends for connection to slip loops 24.

The material of the halter may be leather, nylon, or any suitable strong and flexible material.

When the halter is secured to a dog's head as shown in FIG. 2, tension applied to the leash will be primarily felt around the muzzle area of the dog. The more tightly the leash is pulled, the more tightly the loop member 1 will pull against the dog's muzzle. Thus the handler has a secure grip of the dog's muzzle without causing pain or permanently restraining the dog from opening its mouth. The halter is self-adjusting to a certain degree, in that when the animal moves its head to one side or raises or lowers its head the side loop and collar members can move relative to one another to the extent allowed by the length of the connecting loops. This makes the halter more comfortable and less restricting for the dog and allows it to move its head more easily in response to the handler tensioning the leash.

The removable top member 12 aids in locating the halter on the dog's head and also prevents the dog from pulling or pushing the loop member 1 over its nose.

While the preferred embodiments of the invention have been described, other modifications may be made thereto and other embodiments may be devised within the spirit of the invention and the scope of the appended claims.

1. A training halter for a dog, comprising:
   (a) a loop member for encircling the dog's muzzle;
   (b) a collar member for encircling the dog's head;
   (c) a pair of side members for securing the collar member to the loop member on opposite sides of the dog's head; wherein the forward end of each side member comprises a slip loop, and wherein said loop member comprises an upper portion and a lower portion, each portion having a loop at each end, and said slip loops at the forward ends of said side members engage through said loop on adjacent ends of said upper and lower portions on opposite sides of said muzzle;
   (d) means for securing upper portions of the loop and collar members together;
   (e) means for cinching the loop member;
   (f) means for securing a leash to the cinched loop member.

2. The halter of claim 1, wherein said means for securing upper portions comprises an upper connecting member and means for releasably connecting said upper member to said upper portions of said loop and collar members.

3. The halter of claim 2, wherein said upper connecting member comprises a strap for extending along the top of the dog's head between the collar and loop members.

4. The halter of claim 3, wherein the releasable connecting means comprises snap fasteners.

5. The halter of claim 3, wherein at least one of said upper portions of said loop and collar members is provided with a slit, one end of said strap passing through said slit, and releasable means being provided for connecting said one end to an adjacent portion of said strap.

6. The halter of claim 2, wherein the upper portion of each of said loop and collar members is provided with an opening, and said upper connecting member comprises a cord for connecting through said openings at opposite ends.

* * * * *